(No Model.)
L. A. POWERS.
VEHICLE WHEEL.
No. 298,500. Patented May 13, 1884.
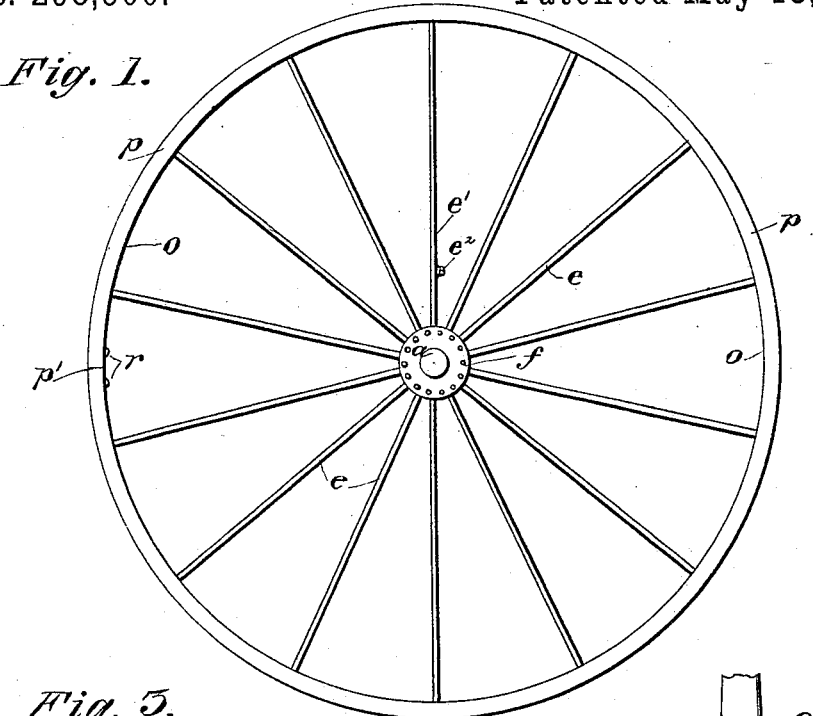
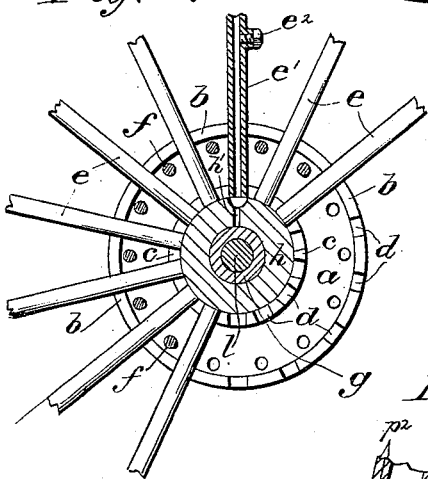
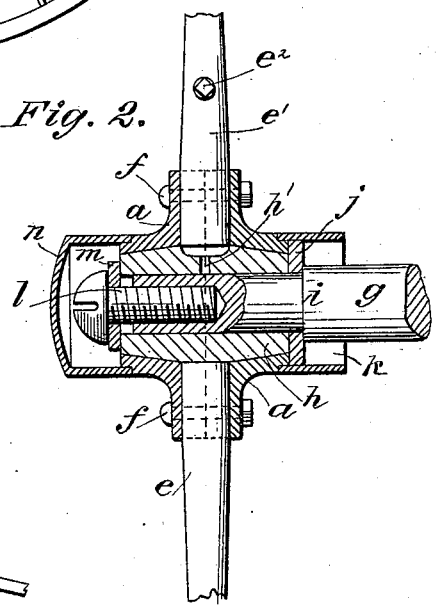
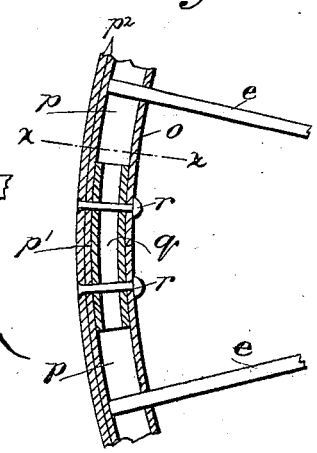
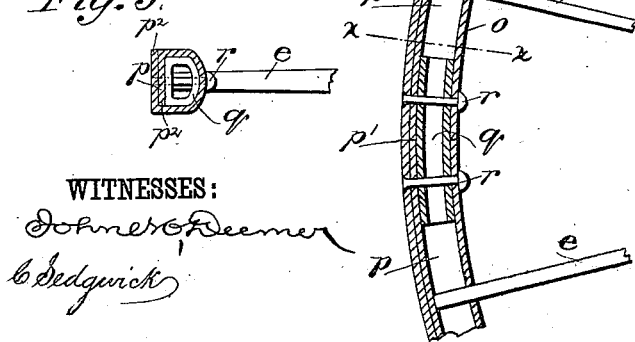
WITNESSES:
INVENTOR:
L. A. Powers
BY Munn & Co
ATTORNEYS.

UNITED STATES PATENT OFFICE.

LYMAN A. POWERS, OF BLOOMINGTON, WISCONSIN.

VEHICLE-WHEEL.

SPECIFICATION forming part of Letters Patent No. 298,500, dated May 13, 1884.

Application filed August 7, 1883. (No model.)

*To all whom it may concern:*

Be it known that I, LYMAN A. POWERS, of Bloomington, in the county of Grant and State of Wisconsin, have invented a new and useful Improvement in Vehicle-Wheels, of which the following is a full, clear, and exact description.

The main object of my invention is to provide a wheel for carriages, wagons, buggies, and other vehicles, which shall be light, strong, and durable, and shall have easy-running qualities.

My invention relates to that class of wheels in which the spokes are secured at their inner ends between two correspondingly-notched hub-plates, and in which the rim is formed of sheet-metal bent into D-form; and the invention consists in certain improvements in the construction of the above-described wheels, as will be hereinafter fully described and claimed.

Reference is to be had to the accompanying drawings, forming a part of this specification, in which similar letters of reference indicate corresponding parts in all the figures.

Figure 1 is a face view of the wheel at the outer side. Fig. 2 is an enlarged sectional elevation of the central parts of the wheel in the plane of the axle. Fig. 3 is a sectional side view of the central parts of the wheel in the plane of the spokes, and with parts removed. Fig. 5 is a section of part of the wheel-rim in the plane of the spokes, and Fig. 4 is a cross-section of the wheel-rim on line $x\,x$, Fig. 4.

I make the hub of the wheel of two similar plates or disks, $a\,a$, which have on their inner faces outer flanges, $b$, and an inner flange, $c$, which are notched radially at $d$ to receive the inner ends of the spokes $e$, which are firmly clamped between the plates $a\,a$ by the screws or bolts $f$, which enter coinciding holes in the plates, as shown. The plates $a\,a$ are recessed centrally, so that when they are bolted together over the spokes their central recess shall preferably be round crosswise of the axle $g$, and shall be inclined or curved inward from the outer ends of the plates toward their inner faces in the plane of the axle, as in Fig. 2, in which recess I place the correspondingly-shaped block or bushing, $h$, which is axially bored to receive the axle $g$, and which turns on the axle to receive the wear as the wheel revolves, the axle being preferably reduced where it enters the hub of the wheel, forming a shoulder, $i$, against which is placed the washer $j$, which overlaps the inner edges of the block $h$ and the inner plate, $a$, and forms with a rabbet cut in the outer edge of this plate a seat for the collar or guard $k$, which overhangs the washer $j$ and its joint with the axle, to exclude the dirt from the bearings of the wheel on the axle at the inside of the wheel. The outer end of axle $g$ is bored axially and internally screw threaded to receive the screw $t$, the head of which bears against a washer, $m$, placed at the outside of block $h$, and the axle $g$ does not extend to the outer end of the block $h$, to permit the wear at the shoulder $i$ to be taken up when required by tightening the screw $l$. A cap, $n$, fitted on the outer plate, $a$, conceals the screw $l$, washer $m$, and block $h$, protects them from dust and damage by collision, and imparts a neat finish to the outside central portion of the wheel.

I make the felly or rim $p$ of the wheel hollow in cross-sectional form by curving sheet-metal plates $o$, and then bending these plates over from the inside of the rim and overlapping the edges of the plates one upon the other in D form, as at $p^2\,p^2$, so that the outer tread or tire-edge of the wheel shall be of double thickness, to better withstand the direct wear on the wheel-tread and the outward thrust of the spokes $e$, which bear against the inside of the tread of the rim after passing through holes in the inner face or wall of the rim, as indicated in Figs. 4 and 5. The joints of the overlapped parts of the tread of the rim $p$ may be secured in any approved manner, and at the cross-joint $p'$ of the meeting ends of the wheel-rim I shall insert a hollow or solid plug-joint plate, $q$, which fits the interior of the rim, and to which the meeting ends of the rim are firmly secured by the screws or bolts $r$, as in Fig. 4. The tread of the wheel, consisting of the double or overlapped plates, may itself receive the wear of travel, or may be fitted with an outer tire, if preferred.

To provide for automatically oiling the bearings of the wheel on the axle $g$, I fit one or more of the hollow spokes of the wheel, as at $e'$, with an aperture in the side for filling with oil, and closed by any suitable screw-cap or plug $e^2$. This hollow spoke $e'$ communicates by an oil-hole, $h'$, in the block $h$ with the axle $g$, and the arrangement of the washers $j\,m$ and screw $l$ for tightening the washers prevents undue waste of oil from either the inner or outer faces of the wheel; and in practice I may enter the oil-reservoir spoke $e'$ slightly into the bearing-block $h$, to cause it to register with the opening $h'$ of the block $h$, to maintain the needed supply of oil to the axle.

In assembling the parts to form a complete wheel, the D-shaped rim $p$ will first be securely joined at $p'$. One of the plates $a$ will be placed about centrally with the block $h$, adjusted therein. The spokes $e$ will then be fitted in the rim and laid with their inner ends against the projecting inclined or convexed end of the block $h$ over notches $d$ in plate $a$, the spokes $e$ being of such length that when the opposite plate $a$ is laid on them and both plates $a$ are drawn up tightly by the bolts $f$ the inner ends of the spokes will be forced up the inclined hub-block $h$, to evenly strain up or "set" the rim or tire without the application of heat, and at an economy of time and labor over the manufacture of wheels as commonly constructed. Should the oiling-spoke $e'$ be longer than spokes $e$, they will be finally adjusted in the rim and block $h$ before the plates $a\,a$ are secured together over the spokes by the screws $f$. The washers $j\,m$, guard $k$, cap $n$, and screw $l$ will be finally adjusted when the wheel is fitted on the axle.

All the spokes $e$ may be hollow, and all parts of the wheel may be made of any suitable material having sufficient strength to resist the strains of use—as, for instance, the wheel-rim may be made of steel plates lap-welded to shape, or of wrought-iron pipe; or the rim may be of wood, with the tire set in the ordinary manner; and it will be understood that the improved hub may be used in a wheel having its other parts made mostly of wood, or of wood and metal, in any preferred manner.

I do not abandon or dedicate to the public any patentable features set forth herein and not hereinafter claimed, but reserve the right to claim the same either in a reissue of any patent that may be granted upon this application or in other applications for Letters Patent that I may make.

Having thus described my invention, I claim as new and desire to secure by Letters Patent—

1. A wheel-rim consisting of the D-shaped plate, whose edges overlap, as at $p^2$, whereby a double thickness of wearing-surface is afforded.

2. A wheel-rim consisting of the D-shaped plate, whose edges are overlapped, as at $p^2$, and whose ends are connected by a plate within said rim, and covering the joint between the meeting ends of the rim, substantially as set forth.

LYMAN A. POWERS.

Witnesses:
P. BARTLEY,
M. T. WOODHOUSE.